(12) United States Patent  
Ahn (10) Patent No.: US 8,659,575 B2  
(45) Date of Patent: Feb. 25, 2014

(54) TOUCH PANEL DEVICE OF DIGITAL CAPACITIVE COUPLING TYPE WITH HIGH SENSITIVITY

(75) Inventor: Young Soo Ahn, Seoul (KR)

(73) Assignee: Sanghyun Han, Gyeonggi-Do (KR)

( * ) Notice: Subject to any disclaimer, the term of this patent is extended or adjusted under 35 U.S.C. 154(b) by 353 days.

(21) Appl. No.: 13/000,736

(22) PCT Filed: Jul. 2, 2009

(86) PCT No.: PCT/KR2009/003613  
§ 371 (c)(1),  
(2), (4) Date: Dec. 22, 2010

(87) PCT Pub. No.: WO2010/002202  
PCT Pub. Date: Jan. 7, 2010

(65) Prior Publication Data  
US 2011/0134073 A1    Jun. 9, 2011

(30) Foreign Application Priority Data

Jul. 4, 2008   (KR) .................. 10-2008-0064935  
Aug. 6, 2008   (KR) .................. 10-2008-0076829

(51) Int. Cl.  
*G06F 3/045*   (2006.01)

(52) U.S. Cl.  
USPC .......................................... 345/174; 345/173

(58) Field of Classification Search  
USPC ................................................ 345/173, 174  
See application file for complete search history.

(56) References Cited

U.S. PATENT DOCUMENTS

| | | | |
|---|---|---|---|
| 7,986,152 B2* | 7/2011 | Philipp et al. ................. | 324/662 |
| 2004/0239650 A1 | 12/2004 | Mackey | |
| 2009/0273572 A1* | 11/2009 | Edwards et al. ............... | 345/173 |

FOREIGN PATENT DOCUMENTS

| | | |
|---|---|---|
| JP | 2008-065748 A | 3/2008 |
| JP | 2008-152806 A | 7/2008 |
| KR | 2007-0006609 A | 1/2007 |

* cited by examiner

*Primary Examiner* — Kwang-Su Yang  
(74) *Attorney, Agent, or Firm* — Rabin & Berdo, P.C.

(57) ABSTRACT

A capacitive touch panel device of a high-sensitivity digital system. The capacitive touch panel device includes a substrate, a display area formed at the center of the substrate, a non-active area formed along the outer periphery of the display area, extending to the end of the substrate, and mounted with a plurality of signal transmitting wire electrodes, two pairs of position sensing main sensor electrodes arranged in a two-dimensional fashion in the display area to display coordinates, a plurality of bridge electrodes interposed between the two pairs of position-sensing main sensor electrodes, an external terminal unit electrically connected to the ends of the plurality of signal transmitting wire electrodes, and a position sensing sub electrode electrically connected to each of the two pairs of position-sensing main sensor electrodes, and arranged in the direction different from the direction wherein the bridge electrodes are connected.

9 Claims, 7 Drawing Sheets

TOUCH PANEL DEVICE OF DIGITAL CAPACITIVE COUPLING TYPE WITH HIGH SENSITIVITY

TECHNICAL FIELD

The present disclosure relates to a high-sensitivity digital capacitive touch panel device and, more particularly, to a light, compact and high-sensitivity digital capacitive touch panel device which can be applied to a large scale touch panel without increasing the number of input/output signal-transmitting wire electrodes, and is capable of precisely detecting the coordinates of a touch point when applied to a touch panel of the same size, thereby saving a space in the touch panel through reduction in the number of input/output signal-transmitting wire electrodes in the touch panel including the same number of main position sensor electrodes.

BACKGROUND ART

With the development and increasing popularity of a graphical user interface (GUI) system, touch panels with simple input structure have been widely used. The touch panels include a resistive film type, a capacitive type, an optical sensor type, an ultrasonic type, an electromagnetic type, a vector force type, etc.

These touch panels have various disadvantages and are not suited to certain applications.

The resistive-film touch panel senses touch when an electrically conductive transparent film interposed between two substrates is touched. The resistive-film touch panel may be more easily implemented than any other touch panel and has high performance. However, the resistive-film touch panel has low mechanical strength and weather resistance.

The optical-sensor touch panel is operated to detect a position when an optical path is blocked between an optical output element and an optical input element. However, the optical-sensor touch panel is affected by light.

The ultrasonic touch panel is operated to detect a position when a sound wave path is blocked between a sound-wave generating element and a sound-wave receiving element. However, the ultrasonic touch panel is vulnerable to noise.

The electromagnetic touch panel is based on Faraday's law of induction and is operated to determine coordinates by calculating the amount of current flowing in a coil at positions on the coordinates. A special pen is required to apply alternating current to operate the electromagnetic touch panel.

The capacitive touch panel senses touch based upon changes in capacitance occurring when a finger contacts a sensor electrode. The conductive touch panel is vulnerable to noise. However, the touch panel of this type may have high weather resistance and high mechanical strength if an appropriate protective layer is employed.

Figure 1:
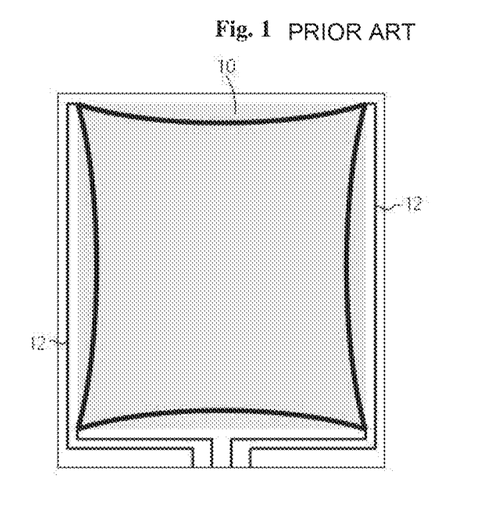
FIG. 1 is a view of a conventional analog electrode structure.

The capacitive touch panel is categorized into an analog type and a digital type. FIG. 1 shows a conventional analog electrode structure and FIG. 2 shows a conventional digital electrode structure.

Figure 2:
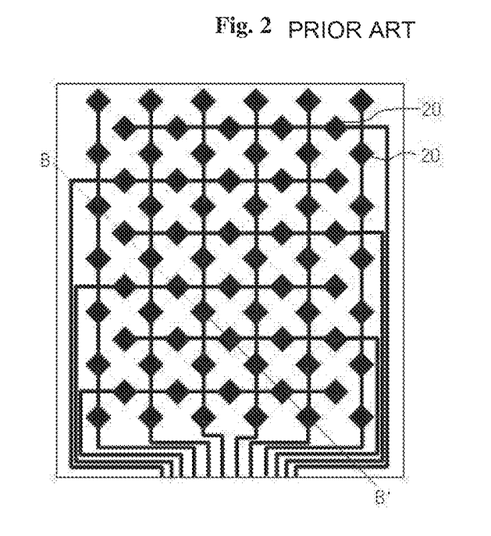
FIG. 2 is a view of a conventional digital electrode structure.

Referring to FIGS. 1 and 2, the analog electrode structure employs a sheet type sensor electrode 10 and does not require a pattern of electrodes within a sensing area, and the digital electrode structure employs a pattern of sensor electrodes 20 within a sensing area. Each of the analog electrode structure and the digital electrode structure includes a protective layer (not shown) having a certain dielectric constant to protect the sensor electrode 10 or 20 from the external environment.

The electrode structure may detect a position by calculating the amount of current flowing through a finger, which can be a conductor of a ground component, when an alternating current signal is applied to the sensor electrode 10 or 20. Alternatively, the electrode structure may detect a position by detecting capacitance changed by a finger when an alternating current signal is applied to one of a pair of electrodes.

In the analog electrode structure of FIG. 1, the coordinates of a position are determined based upon the amount of current, which is measured at four corners, flowing through a finger. Since there are four lead electrodes 12 which transmit electrical signals to the sensor electrode 10 of the touch panel, the width of an area where the lead electrodes 12 are placed is not significantly increased although the size of a screen of the touch panel is increased. Hence, the analog electrode structure permits reduction in weight and thickness of a large scale panel lighter and thinner. However, since the amount of current is calculated as a relative value, a circuit controller is complex and is vulnerable to external noise.

Further, if there are multiple contact points, it is difficult to realize a multi-touch function, since the contact point is recognized as a middle point of the contact points.

Although the digital electrode structure is also vulnerable to external noise, the digital electrode structure can avoid a change of contact point due to a change in initial value resulting from change in temperature, humidity, resistance, etc.

Figure 3:
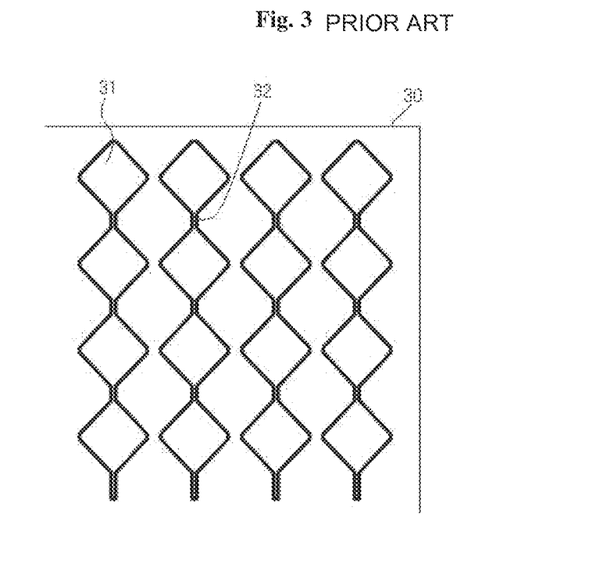
FIGS. 3 and 4 show a conventional digital electrode structure arranged on the X-axis and the Y-axis, respectively.
Figure 4:
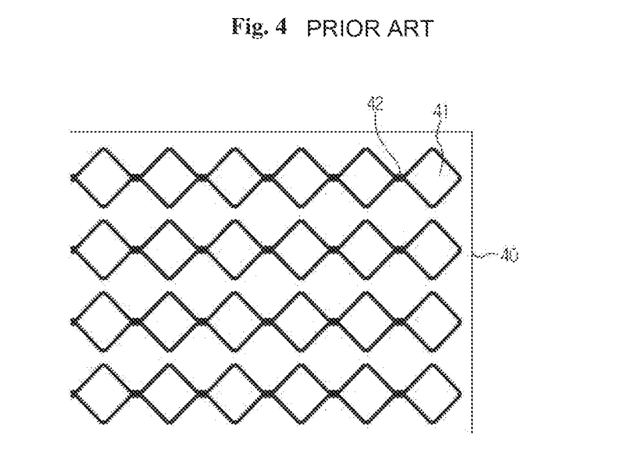

FIGS. 3 and 4 show the digital electrode structure in more detail. That is, FIGS. 3 and 4 show a conventional digital electrode structure arranged on the X-axis and the Y-axis, respectively.

Referring to FIGS. 3 and 4, position sensor electrodes 31, 41 and signal-transmitting bridge electrodes 32, 42 are formed on a substrate 30.

Figure 5:
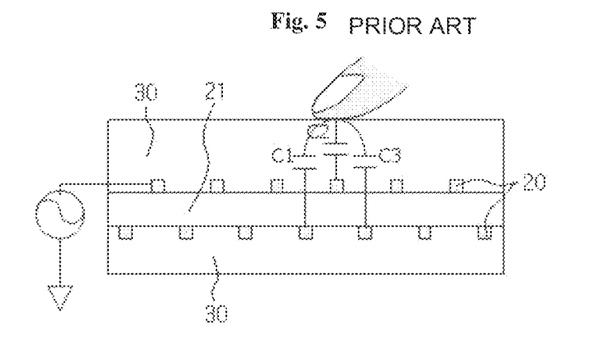
FIG. 5 is a cross-sectional view taken along line B-B' of FIG. 2.

FIG. 5 is a cross-sectional view taken along line B-B' of FIG. 2.

Referring to FIG. 5, the sensor electrodes 20 are discontinuously disposed on upper and lower sides of the substrate 21 and are covered with a protective layer 30 to protect the sensor electrodes from external force.

Unlike the analog electrode structure, when an alternating current signal is applied to X-axis and Y-axis grids where the sensor electrodes 20 are connected to one another, the digital electrode structure measures variation in current flowing through a touch point of a finger on the X-axis and the Y-axis and recognizes a position of a point exhibiting the largest current variation as a contact position of the finger.

The digital electrode structure uses an alternating current signal flowing through parasitic capacitors C1, C2, C3 (see FIG. 5) to calculate coordinates of a touch point. In order to obtain accurate coordinates of the touch position, a predetermined number or more of position sensor electrodes 20 must be disposed per unit area. Next, a mechanism to recognize accurate coordinates of a touch point will be described in detail.

Figure 6:
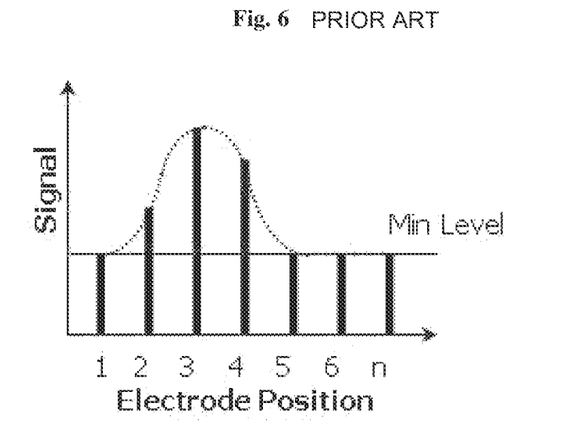
FIG. 6 is a graph illustrating capacitive coupling characteristics of a conventional small-scale digital electrode structure.

FIG. 6 is a graph illustrating capacitive coupling characteristics of a small-sized digital electrode structure according to a related art.

Referring to FIG. 6, accurate coordinates of a touch point may be obtained since there is a sufficient density of position sensor electrodes which communicate signals with a finger. In order to use signals obtained from discontinuous sensor electrodes when calculating the touch coordinates, the signals from each of the sensor electrodes may be represented by normalized Gaussian curves. In this case, a point with the greatest value obtained using a Gaussian function approximated in a region where a signal level is not present between the electrodes may be set as a position coordinate of a point touched by a finger.

Figure 7:
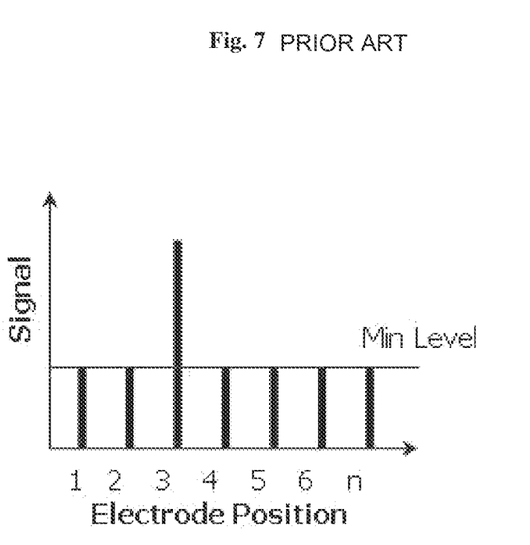
FIG. 7 is a graph illustrating capacitive coupling characteristics of a conventional large-scale digital electrode structure.

Unlike a small-sized digital electrode structure, however, a large scale digital electrode structure may not use the Gaussian function since at least two electrode signals cannot be obtained, as shown in FIG. 7. FIG. 7 is a graph illustrating capacitive coupling characteristics of a conventional large scale digital electrode structure.

Even in the large scale digital electrode structure, an inactive area for signal-transmitting wire electrodes is not significantly increased in width as compared with the small-sized digital electrode structure. In general, an inactive area of a touch panel is designed to be almost the same as an electrode design margin, i.e., a non-viewing area, of a liquid crystal display. The non-viewing area of the liquid crystal display is designed to have a width of 2-3 mm, regardless of the size of the liquid crystal display.

Since the size or number of signal-transmitting wire electrodes is affected by the width of the inactive area, the number of position sensor electrodes provided in a display area cannot be increased compared with the small-sized digital electrode structure.

Hence, since a distance between the sensor electrodes is widened, an area of each sensor electrode is also increased. In this case, increased parasitic capacitance between a finger and the sensor electrode leads to increased coupling. However, the number of sensor electrodes which will be capacitatively coupled with the finger cannot be increased.

If the area of the sensor electrode which will be capacitatively coupled with a finger is increased to a predetermined value or more, it is difficult to sense minute movement of the finger. Thus, the size of the sensor electrode must be determined to allow at least two X-axis and Y-axis sensor electrodes to be present within a contact area when a touch panel is touched using a finger. That is, since the large scale digital electrode structure cannot accurately detect touch coordinates, the size of display devices to which the large scale digital electrode structure can be applied is limited.

DISCLOSURE

Technical Problem

The present disclosure is directed to providing a light, compact and high-sensitivity digital capacitive touch panel device which can be applied to a large scale touch panel without increasing the number of signal-transmitting wire electrodes, and is capable of precisely detecting the coordinates of a touch point when applied to a touch panel of the same size, thereby saving a space in the touch panel through reduction in the number of input/output signal-transmitting wire electrodes in the touch panel including the same number of main position sensor electrodes.

Technical Solution

In accordance with one aspect, a high-sensitivity digital capacitive touch panel device includes: a substrate; a display area formed on a central region of the substrate to display images; an inactive area formed along an outer periphery of the display area, extending to an end of the substrate, and having a plurality of signal-transmitting wire electrodes mounted thereon; two pairs of main position sensor electrodes arranged in two dimensions on the display area to display coordinates; a plurality of bridge electrodes disposed between the two main position sensor electrodes such that the two pairs of the main position sensor electrodes can be electrically connected to each other in each direction therethrough; an external terminal unit electrically connected to one end of each of the signal-transmitting wire electrodes, the other end of which is electrically connected to the two pairs of main position sensor electrodes; and a sub position sensor electrode electrically connected to each of the two pairs of main position sensor electrodes in a different direction than that of the bridge electrodes connected to the main position sensor electrodes.

The two pairs of main position sensor electrodes may extend along the X-axis and the Y-axis, respectively.

At least one sub position sensor electrode may be connected to the main position sensor electrode.

The sub position sensor electrodes may be provided at a right angle to a direction in which the bridge electrodes are provided.

The sub position sensor electrode may have the same shape as the main position sensor electrode.

The sub position sensor electrode may have at least one shape selected from the group consisting of a triangular shape, quadrangular shape, pentagonal shape, hexagonal shape, heptagonal shape, octagonal shape, nonagonal shape, decagonal shape, and circular shape.

The sub position sensor electrode may include a first sub-electrode and a second sub-electrode.

A total area of the first sub-electrode and the second sub-electrode may be identical to that of the sub position sensor electrode.

The first sub-electrode and the second sub-electrode may have an area ratio of $\{x/(m+1)\}:\{m-(x-1)/(m+1)\}$, where "m" indicates the number of sub position sensor electrodes, and "x" indicates the order of a certain sub position sensor electrode.

Advantageous Effects

According to an exemplary embodiment of the present disclosure, the high-sensitivity digital capacitive touch panel device may be applied to a large scale touch panel without increasing the number of input/output signal-transmitting wire electrodes, and is capable of precisely detecting the coordinates of a touch point when applied to a touch panel of the same size, thereby saving a space in the touch panel through reduction in the number of input/output signal-transmitting wire electrodes in the touch panel including the same number of main position sensor electrodes. As a result, the high-sensitivity digital capacitive touch panel device may achieve reduction in weight, thickness, and size.

BEST MODE

Hereinafter, exemplary embodiments of the present disclosure will be described in detail with reference to the accompanying drawings.

The following embodiments are given by way of illustration to provide a thorough understanding of the invention to those skilled in the art. Hence, it should be understood that various modifications, variations, and changes may be made by a person having ordinary knowledge in the art, and that the following embodiments will not limit the scope of the invention. Likewise, it should be noted that the drawings are not to precise scale and some of the dimensions are exaggerated for clarity of description.

In accordance with one exemplary embodiment, a high-sensitivity digital capacitive touch panel device includes: a substrate; a display area formed on a central region of the substrate to display images; an inactive area formed along an outer periphery of the display area, extending to an end of the substrate, and having a plurality of signal-transmitting wire electrodes mounted thereon; two pairs of main position sensor electrodes arranged in two dimensions on the display area to display coordinates; a plurality of bridge electrodes disposed between the main position sensor electrodes such that the two pairs of the main position sensor electrodes can be electrically connected to each other in each direction therethrough; an external terminal unit electrically connected to one end of each of the signal-transmitting wire electrodes, the other end of which is electrically connected to the two pairs of main position sensor electrodes; and a sub position sensor electrode electrically connected to each of the two pairs of main position sensor electrodes in a different direction than that of the bridge electrodes connected to the main position sensor electrodes.

Figure 8:
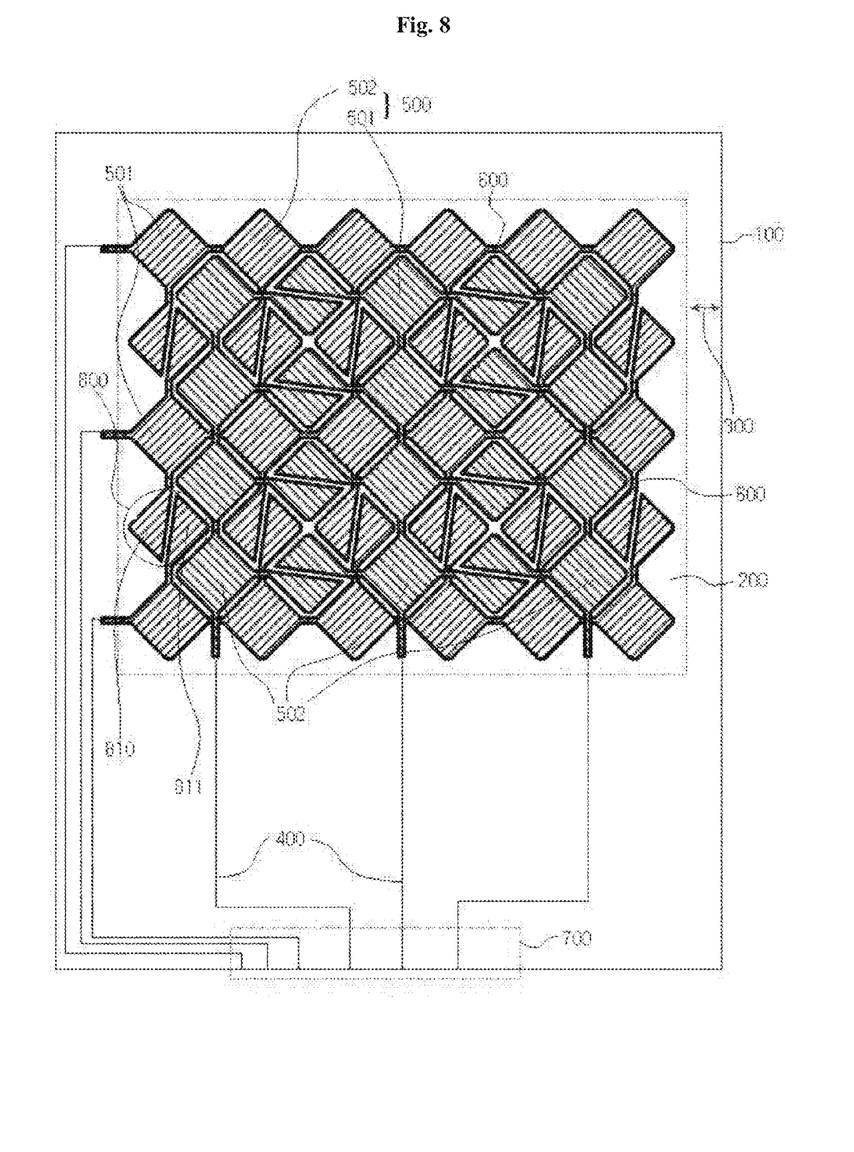
FIG. 8 is a schematic view of a high-sensitivity digital capacitive touch panel device according to an exemplary embodiment of the present disclosure.

FIG. 8 illustrates a high-sensitivity digital capacitive touch panel device according to one exemplary embodiment of the present disclosure.

Referring to FIG. 8, the capacitive touch panel includes a substrate 100, a display area 200, an inactive area 300, signal-transmitting wire electrodes 400, main position sensor electrodes 501, 502, bridge electrodes 600, an external terminal unit 700, and sub position sensor electrodes 800.

With this structure, it is possible to implement a thin, lightweight and high-sensitivity digital capacitive touch panel device which is capable of recognizing an input signal without increasing the number of signal-transmitting wire electrodes 400.

The substrate 100 may be, for example, made of at least one selected from the group of glass, plastic and film. The shape of the substrate 100 may have a polygonal shape, such as a tetragonal shape, or a circular shape.

The substrate 100 may be generally divided into the display area 200 and the inactive area 300. The display area 200 is used to display an image in response to an input signal generated by touching a point thereon or when the exemplary embodiment is implemented in a display device, such as a liquid crystal display (LCD), plasma display, OLED display or field emission display. The inactive area 300 is covered by a product case surrounding the display device to protect the display device.

The signal-transmitting wire electrodes 400 are formed on the inactive area 300. The external terminal unit 700 is provided to one end of each of the signal-transmitting wire electrodes 400 to electrically connect the signal-transmitting wire electrodes 400 to an external electrical circuit (not shown), such as a flexible printed circuit (FPC).

Two pairs of main position sensor electrodes 501, 502 are disposed in the display area 200.

Referring to FIG. 8, the two pairs of electrodes refer to two groups of electrodes, i.e., the main position sensor electrodes 501 arranged along a horizontal axis and the other main position sensor electrodes 502 arranged along a vertical axis, both of which recognize coordinates of a touch point in response to an external signal. For example, in an X-Y absolute coordinate system, the two groups of electrodes are the main position sensor electrodes 501, which correspond to Y-axis main position sensor electrodes to sense positions on the X-axis, and the main position sensor electrodes 502, which correspond to X-axis main position sensor electrodes to sense positions on the Y-axis.

The main position sensor electrodes are electrically connected to each other through the bridge electrodes 600.

The main position sensor electrodes 501, 502 are connected to the corresponding signal-transmitting wire electrodes 400, respectively.

Each of the main position sensor electrodes 501, 502 is connected to at least one sub position sensor electrodes 800 in a different direction than that of the bridge electrodes 600 connected to the main position sensor electrodes 501, 502.

In one embodiment, in order to accurately recognize coordinates of a touch point, the sub position sensor electrodes 800 control an area ratio of a sub position sensor electrode 800, which is electrically connected to an N-th main position sensor electrode 501, and a sub position sensor electrode 800, which is electrically connected to an (N+1)-th main position sensor electrode 501, so that a positional change within the N-th and (N+1)-th main position sensor electrodes 501 on the horizontal axis may be recognized as a change in coupling capacitance.

In this case, each of the sub position sensor electrodes 800 is divided into two parts, i.e., first and second sub-electrodes 810 and 811. The first sub-electrodes 810 are electrically connected to each other through the bridge electrodes 600. The second sub-electrodes 811 are also electrically connected to each other through the bridge electrodes 600.

If m sub position sensor electrodes 800 are connected to the N-th and (N+1)-th main position sensor electrodes 501, the area of the first sub-electrode 810 is gradually decreased from N-th to (N+1)-th main position sensor electrodes 501 according to the following expression 1:

$$\frac{m}{m+1}, \frac{m-1}{m+1}, \frac{m-2}{m+1}, \cdots, \frac{1}{m+1}$$

On the contrary, the area of the second sub-electrode 811 is gradually increased from (N+1)-th to N-th main position sensor electrodes 501 according to the following expression 2:

$$\frac{1}{m+1}, \frac{2}{m+1}, \frac{3}{m+1}, \cdots, \frac{m}{m+1}$$

As can be seen from Expressions 1 and 2, the sub position sensor electrodes 800 occupies the same area as the main position sensor electrodes 501, 502, which may be expressed by Equation 3:

$$\{x/(m+1)\}+\{m-(x-1)/(m+1)\}=1$$

That is, it can be seen that any one of the m sub position sensor electrodes 800, e.g., x-th sub position sensor electrode, has the same area as the main position sensor electrode. It should be understood that the term 'same' includes 'similar' within a tolerance of electrical sensitivity.

Another embodiment of m=3 will be described in more detail.

Figure 9:
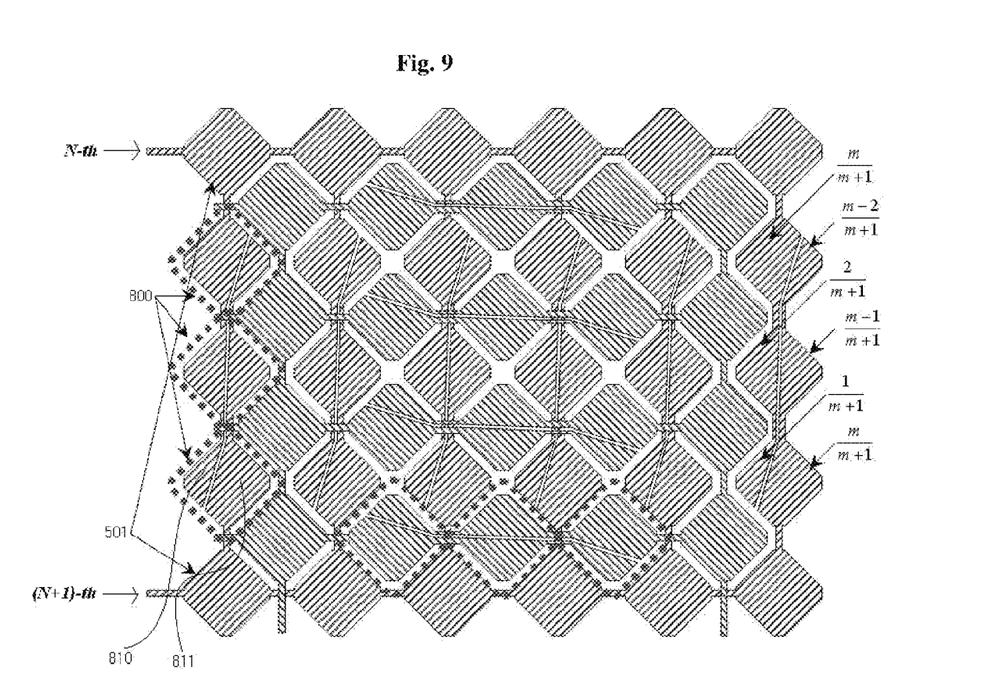
FIG. 9 illustrates the high-sensitivity digital capacitive touch panel device according to the embodiment of the present disclosure, showing sub position sensor electrodes.

FIG. 9 illustrates a high-sensitivity digital capacitive touch panel device according to an exemplary embodiment of the present disclosure, showing sub position sensor electrodes.

Referring to FIG. 9, the main position sensor electrode 501 is connected to three sub position sensor electrodes 800. Each of the three sub position sensor electrodes 800 includes first and second sub-electrodes 810 and 811.

The first sub-electrode 810 of the first sub position sensor electrode, which is connected to the N-th main position sensor electrode 501, has an area of $\{3/(3+1)\}=0.75$, and the second sub-electrode 811 has an area of $\{1/(3+1)\}=0.25$, according to expressions 1 and 2. Hence, it can be seen that the total area of the first and second sub-electrodes 810 and 811 is equal to $0.25+0.75=1$.

It should be understood that such relation may be applied to a vertical axis as well as a horizontal axis corresponding to N-th and (N+1)-th main position sensor electrodes.

The main position sensor electrode may have the same shape as the sub position sensor electrode. The sub position sensor electrode may have at least one shape selected from the group consisting of a triangular shape, quadrangular shape, pentagonal shape, hexagonal shape, heptagonal shape, octagonal shape, nonagonal shape, decagonal shape, and circular shape. It should be understood that the main position sensor electrode or the sub position sensor electrode may have any one of the shapes or a combination thereof as long as touch coordinates are accurately recognized and analyzed by external electronic circuits upon capacitive coupling.

Figure 10A:
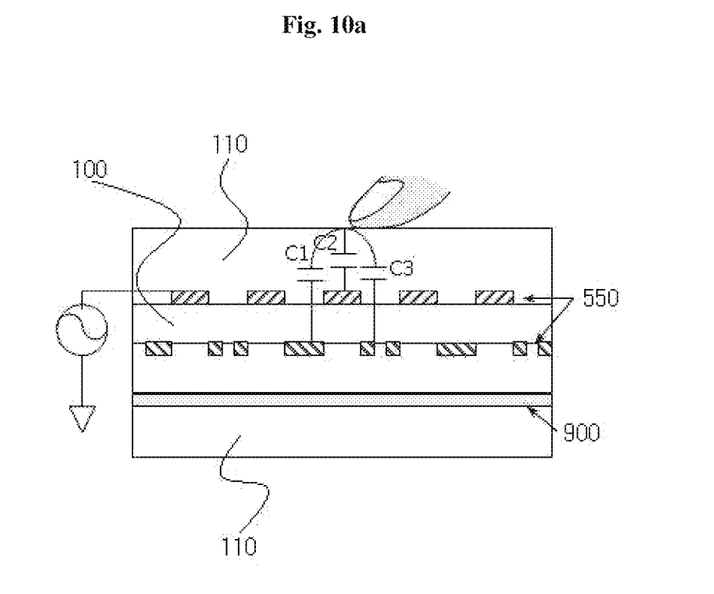
FIGS. 10a and 10b are cross-sectional views of a high-sensitivity digital capacitive touch panel device according to an exemplary embodiment of the present disclosure.
Figure 10B:
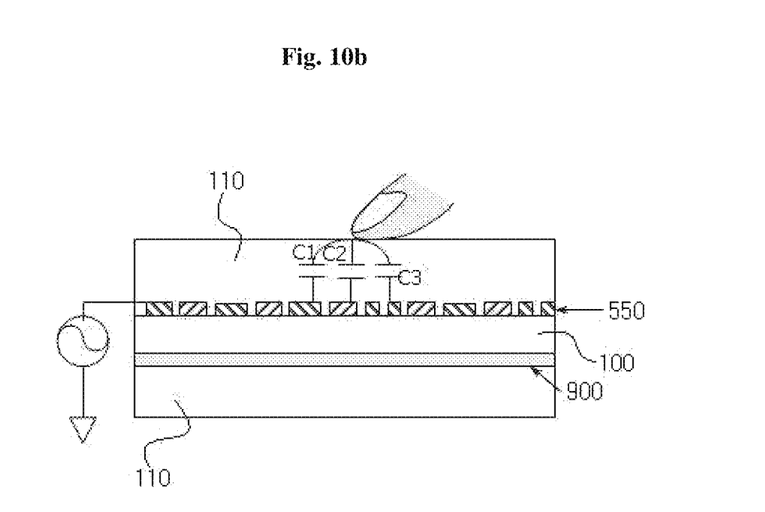

FIGS. 10*a* and 10*b* are cross-sectional views of a high-sensitivity digital capacitive touch panel device according to one exemplary embodiment of the present disclosure.

Referring to FIGS. 10*a* and 10*b*, the touch panel includes a protective layer 110, sensor electrodes 550, a substrate 100 and shielding electrodes 900.

The sensor electrode 550 corresponds to the main position sensor electrode or the sub position sensor electrode as described above. In FIG. 10*a*, the sensor electrodes 550 are provided on upper and lower sides of the substrate 100. In FIG. 10*b*, the sensor electrodes 550 are provided on one side of the substrate 100. The high-sensitivity digital capacitive touch panel device according to the embodiment may be applied to the structures shown in FIGS. 10*a* and 10*b*. For example, the main position sensor electrodes disposed along the aforementioned horizontal axis may be provided on an upper side and the main position sensor electrode disposed along the aforementioned vertical axis may be provided on a lower side. If the main position sensor electrodes disposed along the horizontal axis and the main position sensor electrodes disposed along the vertical axis are provided on one side of the substrate 100, bridge electrodes for connecting the plurality of main position sensor electrodes to each other may be partly overlapped to form an overlapped part, which is likely to be electrically short. In this case, the overlapped part is provided with an insulating portion between the bridge electrodes. The insulating portion may be formed by screen printing, optical processing or the like.

The shielding electrode 900 is provided to eliminate noise from an electronic system, such as a display device provided below the shielding electrode 900. However, the shielding electrode 900 may be omitted if the noise is negligible.

The invention claimed is:

1. A high-sensitivity digital capacitive touch panel device comprising:
a substrate;
a display area formed on a central region of the substrate to display images;
an inactive area formed along an outer periphery of the display area and extending to an end of the substrate, the inactive area having a plurality of signal-transmitting wire electrodes mounted thereon;
two pairs of main position sensor electrodes arranged in two dimensions on the display area to display coordinates;
a plurality of bridge electrodes disposed between the main position sensor electrodes such that the two pairs of the main position sensor electrodes can be electrically connected to each other in each direction therethrough;
an external terminal unit electrically connected to one end of each of the signal-transmitting wire electrodes, the other end of which is electrically connected to the two pairs of the main position sensor electrodes; and
a sub position sensor electrode electrically connected to each of the two pairs of the main position sensor electrodes in a different direction than that of the bridge electrodes connected to the main position sensor electrodes.

2. The high-sensitivity digital capacitive touch panel device of claim 1, wherein the two pairs of the main position sensor electrodes extend along an X-axis and a Y-axis, respectively.

3. The high-sensitivity digital capacitive touch panel device of claim 1, wherein at least one sub position sensor electrode is connected to the main position sensor electrode.

4. The high-sensitivity digital capacitive touch panel device of claim 3, wherein the sub position sensor electrode is provided at a right angle to a direction in which the bridge electrodes are provided.

5. The high-sensitivity digital capacitive touch panel device of claim 1, wherein the sub position sensor electrode has the same shape as the main position sensor electrode.

6. The high-sensitivity digital capacitive touch panel device of claim 1, wherein the sub position sensor electrode has at least one shape selected from the group consisting of a triangular shape, a quadrangular shape, a pentagonal shape, a hexagonal shape, a heptagonal shape, an octagonal shape, a nonagonal shape, a decagonal shape, and a circular shape.

7. The high-sensitivity digital capacitive touch panel device of claim 1, wherein the sub position sensor electrode comprises a first sub-electrode and a second sub-electrode.

8. The high-sensitivity digital capacitive touch panel device of claim 7, wherein a total area of the first sub-electrode and the second sub-electrode is the same as that of the sub position sensor electrode.

9. The high-sensitivity digital capacitive touch panel device of claim 7, wherein the first sub-electrode and the second sub-electrode have an area ratio of $\{x/(m+1)\}:\{m-(x-1)/(m+1)\}$, where "m" indicates the number of the sub position sensor electrodes and is a natural number, and "x" indicates the order of a certain sub position sensor electrode and is a natural number which is less than or equal to "m".

\* \* \* \* \*